United States Patent
Rosa, Jr.

(10) Patent No.: US 10,915,352 B2
(45) Date of Patent: Feb. 9, 2021

(54) ASSERTING INITIALIZATION STATUS OF VIRTUALIZED SYSTEM

(71) Applicant: Red Hat, Inc., Raleigh, NC (US)

(72) Inventor: Cleber Rodrigues Rosa, Jr., Manchester, NH (US)

(73) Assignee: Red Hat, Inc., Raleigh, NC (US)

( * ) Notice: Subject to any disclaimer, the term of this patent is extended or adjusted under 35 U.S.C. 154(b) by 55 days.

(21) Appl. No.: 16/275,753

(22) Filed: Feb. 14, 2019

(65) Prior Publication Data

US 2020/0264913 A1  Aug. 20, 2020

(51) Int. Cl.
*G06F 9/4401* (2018.01)
*G06F 9/455* (2018.01)

(52) U.S. Cl.
CPC ........ *G06F 9/45558* (2013.01); *G06F 9/4411* (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,402,309 B2* | 3/2013 | Timashev | ............ | G06F 9/44589 714/15 |
| 8,438,654 B1* | 5/2013 | von Eicken | ............. | G06F 21/53 709/217 |
| 8,909,800 B1* | 12/2014 | Grebenschikov | ... | G06F 9/45558 709/223 |
| 8,918,879 B1* | 12/2014 | Li | ............ | G06F 21/568 713/2 |
| 9,009,840 B1* | 4/2015 | Stickle | ............ | G06F 21/12 726/17 |
| 9,146,763 B1* | 9/2015 | Mehat | ............ | G06F 9/45533 |
| 9,477,486 B2* | 10/2016 | Raj | ............ | G06F 9/45558 |
| 2009/0182928 A1* | 7/2009 | Becker | ............ | G06F 9/45558 711/6 |
| 2010/0058338 A1* | 3/2010 | Schneider | ............ | G06F 9/4486 718/1 |
| 2010/0138815 A1* | 6/2010 | Schneider | ............ | G06F 8/41 717/141 |

(Continued)

OTHER PUBLICATIONS

Juniper Networks, "Using Cloud-Init in an Openstack Environment to Automate the Initialization of Vsrx Instances", Aug. 24, 2018, 108 pages. https://www.juniper.net/documentation/en_US/vsrx/topics/task/configuration/security-vsrx-cloud-init-support.html.

(Continued)

*Primary Examiner* — Isaac T Tecklu
(74) *Attorney, Agent, or Firm* — Lowenstein Sandler LLP

(57) ABSTRACT

Systems and methods for asserting the initialization status of a virtualized system. An example method comprises: specifying, by a virtualization manager, configuration settings of a virtual machine instance, wherein the configuration settings comprise a callback address and an identifier of the virtual machine instance; causing a host computer system to boot the virtual machine instance using the configuration settings; receiving, at the callback address, a notification comprising the identifier of the virtual machine; and determining, in view of the notification, an initialization status of the virtual machine instance.

20 Claims, 7 Drawing Sheets

(56) References Cited

U.S. PATENT DOCUMENTS

| | | | | |
|---|---|---|---|---|
| 2012/0246645 | A1* | 9/2012 | Iikura | G06F 8/61 |
| | | | | 718/1 |
| 2013/0332752 | A1* | 12/2013 | Iwata | G06F 1/3206 |
| | | | | 713/300 |
| 2016/0048436 | A1* | 2/2016 | Yamazaki | G06F 11/3051 |
| | | | | 713/2 |
| 2016/0062783 | A1* | 3/2016 | Falkco | G06F 9/45558 |
| | | | | 718/1 |
| 2018/0102904 | A1* | 4/2018 | Lin | H04L 9/0891 |
| 2019/0207764 | A1* | 7/2019 | Maximov | G06F 8/71 |
| 2019/0317798 | A1* | 10/2019 | Mifune | G06F 9/45558 |
| 2019/0354675 | A1* | 11/2019 | Gan | G06F 9/45558 |
| 2020/0007405 | A1* | 1/2020 | Chitalia | G06F 9/5077 |
| 2020/0110628 | A1* | 4/2020 | Sevindik | G06F 9/505 |

OTHER PUBLICATIONS

"Using Cloud-Init for Virtual Machine Guest Initialization", accessed Oct. 31, 2018, 1 page. https://docs.openvz.org/openvz_users_guide.webhelp/_using_cloud_init_for_virtual_machine_guest_initialization.html.

nutanix.com, "Virtual Machine Customization" accessed Oct. 31, 2018, 1 page https://portal.nutanix.com/#/page/docs/details?targetId=Web-Console-Guide-Prism-v55:wc-vm-image-customize-wc-c.html.

Schiffman et al, "Justifying Integrity Using a Virtual Machine Verifier", Computer Science and Engineering Department, Pennsylvania State University, 2009 Annual Computer Security Applications Conference, 10 pages https://dl.acm.org/citation.cfm?id=1723223.

* cited by examiner

ASSERTING INITIALIZATION STATUS OF VIRTUALIZED SYSTEM

TECHNICAL FIELD

The present disclosure is generally related to cloud computing, and is more specifically related to asserting the initialization status of a virtualized system.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of the several deployment models, including private cloud, community cloud, public cloud and hybrid cloud.

Cloud infrastructure is a collection of hardware and software that implements the cloud computing model. Cloud infrastructure may be viewed as comprising a physical layer and an abstraction layer. The physical layer may comprise hardware resources designed to support the cloud services being provided, and typically includes server, storage and network components. The abstraction layer may comprise the software deployed across the physical layer, which manifests the essential cloud characteristics. Conceptually the abstraction layer resides above the physical layer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
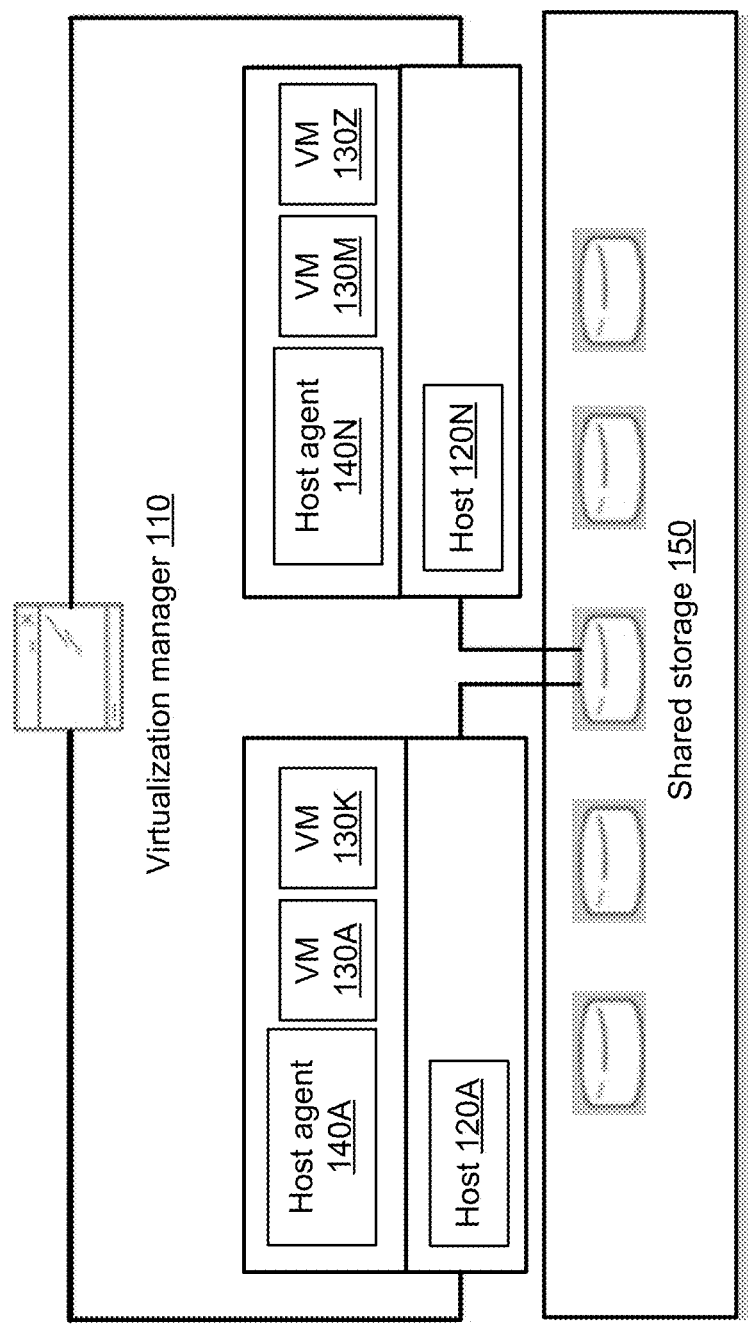
FIG. 1 schematically depicts a high-level component diagram of an example virtualization environment, in accordance with one or more aspects of the present disclosure.

Described herein are methods and systems for asserting the initialization status of a virtualized system.

An example virtualization environment may include one or more host computer systems running multiple virtual machines managed by a virtualization manager. One of the important administrative tasks with respect to virtualization environments is to determining the initialization status of a given virtual machine instance, i.e., to ascertain whether the given virtual machine instance has booted successfully. Since a wide variety of guest operating systems may be supported, especially in testing environments, determination of the initialization status is a non-trivial task. In common implementations, it may involve launching a guest operating system console, logging in to the guest operating system, inspecting the list of active processes, etc. Manually performing these tasks may place an unreasonable burden on the system administrators, especially in large virtualization environments. Automating these tasks, e.g., by running executable scripts, may equally place an unreasonable burden on the system administrators, since such executable scripts may need to be customized for each guest operating system supported by the virtualization environment.

The present disclosure alleviates these and other deficiencies of various common implementations by providing methods and systems for asserting the initialization status of a virtualized system. In an illustrative example, the virtualization manager may define the configuration settings of each virtual machine instance to be built, including a unique identifier of the virtual machine instance and a callback address to be utilized by the virtual machine instance for reporting its initialization status. The virtualization manager may further initialize a callback server that would accept callback messages from the virtual machine instances at the specified callback address.

The virtual machine image utilized for booting the virtual machine instance may be pre-configured to include a run-time request for the configuration settings (such as the unique identifier of the virtual machine instance and the callback address), such that the request would be issued by the virtual machine boot process at a specified point in the boot sequence. In certain implementations, this may be accomplished by means of a virtual machine instance initialization service, such as cloud-init service.

Accordingly, the virtualization manager may store, at a predetermined location, one or more files specifying the configuration settings of the virtual machine instance, for subsequent retrieval by the virtual machine instance initialization service. These configuration settings may be utilized by an executable script (referred herein as "callback script") that is invoked by the virtual machine instance initialization service at a specified point in the virtual machine boot sequence in order to transmit, to the specified callback address of the callback server, a callback message including the unique identifier of the virtual machine instance and asserting the initialization status of the virtual machine instance.

Responsive to receiving the callback message, the callback server may notify the virtualization manager, which may accordingly update the initialization status of the virtual machine instance, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically depicts a high-level component diagram of an example virtualization environment 100, in accordance with one or more aspects of the present disclosure. As schematically illustrated by FIG. 1, the virtualization environment 100 may be managed by the virtualization manger 110 which may provide a graphical user interface and a RESTful API to manage the virtualization environment resources.

Such resources may include virtual machine instances 130A-130Z running on one or more host computer systems 120A-120N. The host agent 140A-140N may run as a daemon on the respective hosts 120A-120N in order to manage and monitor the storage, memory and network resources of each hosts, as well as to facilitate communications of the host with the virtualization manager 110. In various implementations, the host agent may further coordinate virtual machine creation, statistics gathering, log collection and other host administration tasks. The virtualization manager 110 may act as a client with respect to each host agent 140A-140N, and may communicate to the host agents 140A-140N via XML-RPC or any other suitable protocol.

In certain implementations, the hosts 120A-120N may be grouped in one or more clusters, such that hosts in the same cluster would share the same network infrastructure and storage, thus forming a migration domain within which virtual machines may be moved from one host to another.

While in the illustrative example of FIG. 1 the virtualization manager 110 is shown as running on a separate physical machine, in various alternative implementations the virtualization manager 110 may run on a virtual machine hosted in a separate virtualization environment or may be collocated with one of the hosts 120A-120N.

The virtualization resources may further include the shared storage 150, which can be hosted locally or on one or more remote servers. The storage 150 may implement several storage domains, including the data domain for storing the data manipulated by the virtual machines 130A-130Z and the ISO domain for storing the image files for installing the virtual machines and additional applications.

A set of virtualization resources may form a data center, which is the highest level logical container for all physical and logical resources within the managed virtualization environment, including the host clusters, virtual machines, storage domains, and networks.

Figure 2:
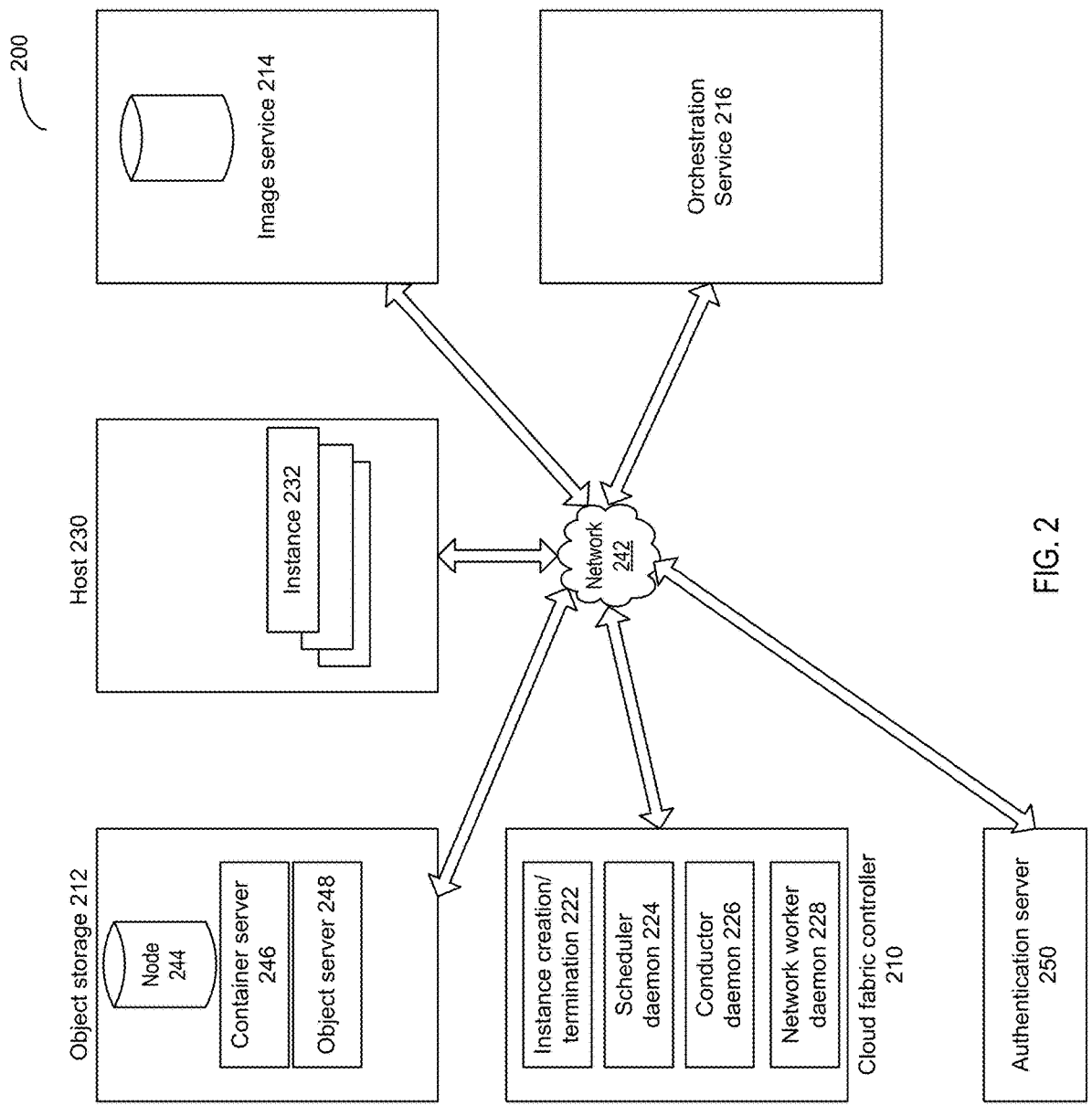
FIG. 2 depicts a flow diagram of an illustrative example of a method for asserting the initialization status of a virtualized system, in accordance with one or more aspects of the present disclosure.

FIG. 2 schematically depicts a high-level component diagram of another example virtualization environment implementing the OpenStack platform, in accordance with one or more aspects of the present disclosure. As shown in FIG. 2, the virtualization environment 200 may comprise a cloud fabric controller service 210, an object storage service 212, an image service 214, and an orchestration service 216. While FIG. 2 illustrates each of the above listed services running on a dedicated hardware server, in certain implementations, two or more of those services may be collocated on a single hardware server. The physical servers executing the above listed services may be interconnected by one or more networks 242, including one or more local area networks, one or more wide area networks, or any combination thereof.

The cloud fabric controller service 210, which is employed for hosting and managing cloud computing systems, may comprise several daemon processes, including a worker daemon 222 that creates and terminates virtual machine instances through hypervisor APIs, a scheduler daemon 224 that retrieves a virtual machine instance requests from a queue and assigns each request to a host computer, a conductor daemon 226 that manages interactions between worker daemon 222 and a cloud database, and a network worker daemon 228 that retrieves and performs networking tasks from a queue.

The object storage service 212 may provide a multi-tenant object storage system for large amounts of unstructured data. In certain implementations, the object storage service 212 may implement a REST-compliant application programming interface (API). In an illustrative example, the object storage service 212 may comprise one or more storage nodes 244, one or more container servers 246 to manage mappings of object containers, one or more object servers 248 to manage objects (such as files) on the storage nodes, and one or more authentication servers 250 to manage accounts defined within the object storage service.

The image service 214 may be employed to discover, register, and retrieve virtual machine images. The service includes a REST-compliant API that allows users to query virtual machine image metadata and retrieve images via HyperText Transfer Protocol (HTTP) requests. Virtual machine images made available through the image service may be stored in a variety of locations, including the object storage service, various file systems, S3 file system, HTTP access to remote Internet locations, and/or block devices.

The orchestration service 216 may be employed for combining virtual machines, networking elements, and other cloud resources into a running stack. The virtualization environment 200 may comprise one or more hosts 230 on which a plurality of virtual machines instances 232 may be instantiated. The virtualization environment 200 may provide command line-based, HTTP-based and/or API-based instance management.

Figure 3:
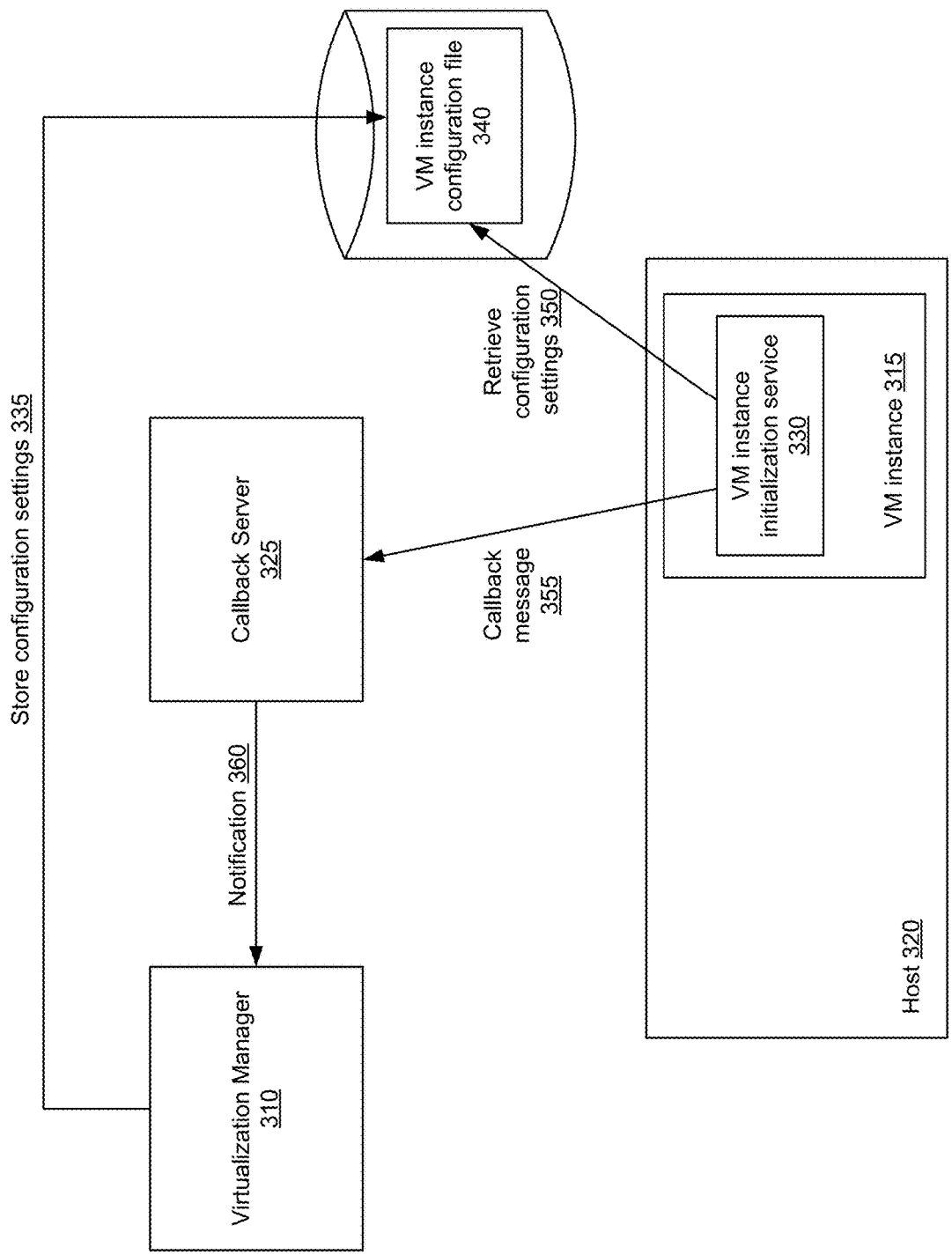
FIG. 3 schematically illustrates an example workflow performed by the virtualization manager for asserting the initialization status of a virtualized system, in accordance with one or more aspects of the present disclosure.

In various illustrative examples, the virtualization manger 110 of FIG. 1 or orchestration service 116 of FIG. 2 (collectively referred to as "virtualization manager") may implement the methods of asserting the initialization status of a virtualized system described herein. As shown in FIG. 3, which schematically illustrates an example workflow performed by the virtualization manager for asserting the initialization status of a virtualized system in accordance with one or more aspects of the present disclosure, the virtualization manager 310 may define the configuration settings of each virtual machine instance to be built, including the example virtual machine instance 315 to be initialized on the host 320. The configuration settings may include a unique identifier of the virtual machine instance and a callback address to be utilized by the virtual machine instance for reporting its initialization status. The unique identifier may be represented by a cryptographic secret (e.g., an integer value of a predetermined size, generated by a random number generator or derived from an entropy source) to be shared between the virtualization manager 310 and the virtual machine instance. In various implementations, the callback address may be represented by a network address (such as an Internet Protocol (IP) address), by a combination of a network address, a protocol, and a port number, or by a Uniform Resource Identifier (URI) in the form of protocol://network-address:port/filesystem-path. In certain implementations, a single callback address may be shared between multiple virtual machine instances. Alternatively, a unique callback address may be specified for each virtual machine instance to be built.

The virtualization manager 310 may further initialize a callback server 325 that would accept, at the specified callback address, messages from the virtual machine instances, e.g., the example virtual machine instance 315. While in FIG. 3 the virtualization manager 310 and the callback server 325 are shown as separate components, the component designation is purely functional. In various implementations, the callback server 325 may be implemented by one or more software modules which may run on a separate physical computer system or may be collocated with one or more software components implementing the virtualization manager 310.

The virtual machine image utilized for booting the virtual machine instance may be pre-configured to include a runtime request for the configuration settings (such as the unique identifier of the virtual machine instance and the callback address), such that the request would be issued by the virtual machine boot process at a specified point in the boot sequence. In certain implementations, this may be accomplished by means of a virtual machine instance initialization service 330, such as cloud-init service.

The virtual machine instance initialization service 330, which may be invoked by the virtual machine boot process at a specified point in the boot sequence, may retrieve certain data, including executable scripts and/or configuration files from predetermined locations, and may perform the actions specified by the retrieved executable scripts and/or configuration files. In an illustrative example, the location for retrieval the executable scripts and/or configuration files may be provided by a file having a predetermined name residing on a virtual disk of a predetermined type (such as a virtual CD drive or a virtual floppy drive). In another illustrative example, the location for retrieval the executable scripts and/or configuration files may be provided by a predetermined URI in the form of protocol://network-address:port/filesystem-path.

Accordingly, the virtualization manager 310 may store (operation 335), at the predetermined location, one or more files 340 specifying the configuration settings of the virtual machine instance, for subsequent retrieval (operation 350) by the virtual machine instance initialization service 330. As noted herein above, the configuration of the virtual machine instance may include various configuration settings, including the unique identifier of the virtual machine instance and the callback address to be utilized by the virtual machine instance for reporting its initialization status.

These configuration settings may be utilized by an executable script (referred herein as "callback script") that is invoked by the virtual machine instance initialization service at a specified point in the virtual machine boot sequence in order to transmit a callback message 355 including the unique identifier of the virtual machine instance to the specified callback address of the callback server 325. In an illustrative example, the callback message 355 may further include at least part of a specified system log file. In another illustrative example, the callback message 355 may further include values of certain configuration parameters of the virtual machine instance and/or values of certain environment variables of the virtual machine instance.

In certain implementations, the callback script may be supplied as part of the virtual machine image utilized for booting the virtual machine instance 315. Alternatively, the callback script may be dynamically injected into the virtual machine instance 315, e.g., by storing the callback script at the predetermined location for subsequent retrieval (operation 350) by the virtual machine instance initialization service 330. In either case, the virtual machine instance initialization service 330 may be configured to invoke the callback script with the parameters provided by the above-described virtual machine configuration settings (including the virtual machine unique identifier and the callback address) at a specified point of the virtual machine boot sequence (e.g., after starting all drivers and mounting all filesystems). Upon invocation, the callback script would compile and transmit, to the specified callback address of the callback server 325, the callback message 355 including the unique identifier of the virtual machine instance and/or other values which may provide information regarding the configuration and functioning of the virtual machine instance, as described herein above.

Responsive to receiving the callback message 355, the callback server 325 may transmit a notification 360 (e.g., by forwarding the callback message 355) to the virtualization manager 310, which may accordingly update, e.g., in a memory data structure, the initialization status of the virtual machine instance 315. In an illustrative example, the virtualization manager 310 may assign the "success" value to the initialization status of the virtual machine instance 315. In an illustrative example, the virtualization manager 310 may further store, in the memory data structure, other values conveyed by the callback message 355, as described herein above.

Conversely, responsive to failing to receive the notification 360 within a predetermined period of time elapsed since initiating the boot operation of the virtual machine instance 315, the virtualization manager 310 may assign the "failure" value to the initialization status of the virtual machine instance 315.

Figure 4:
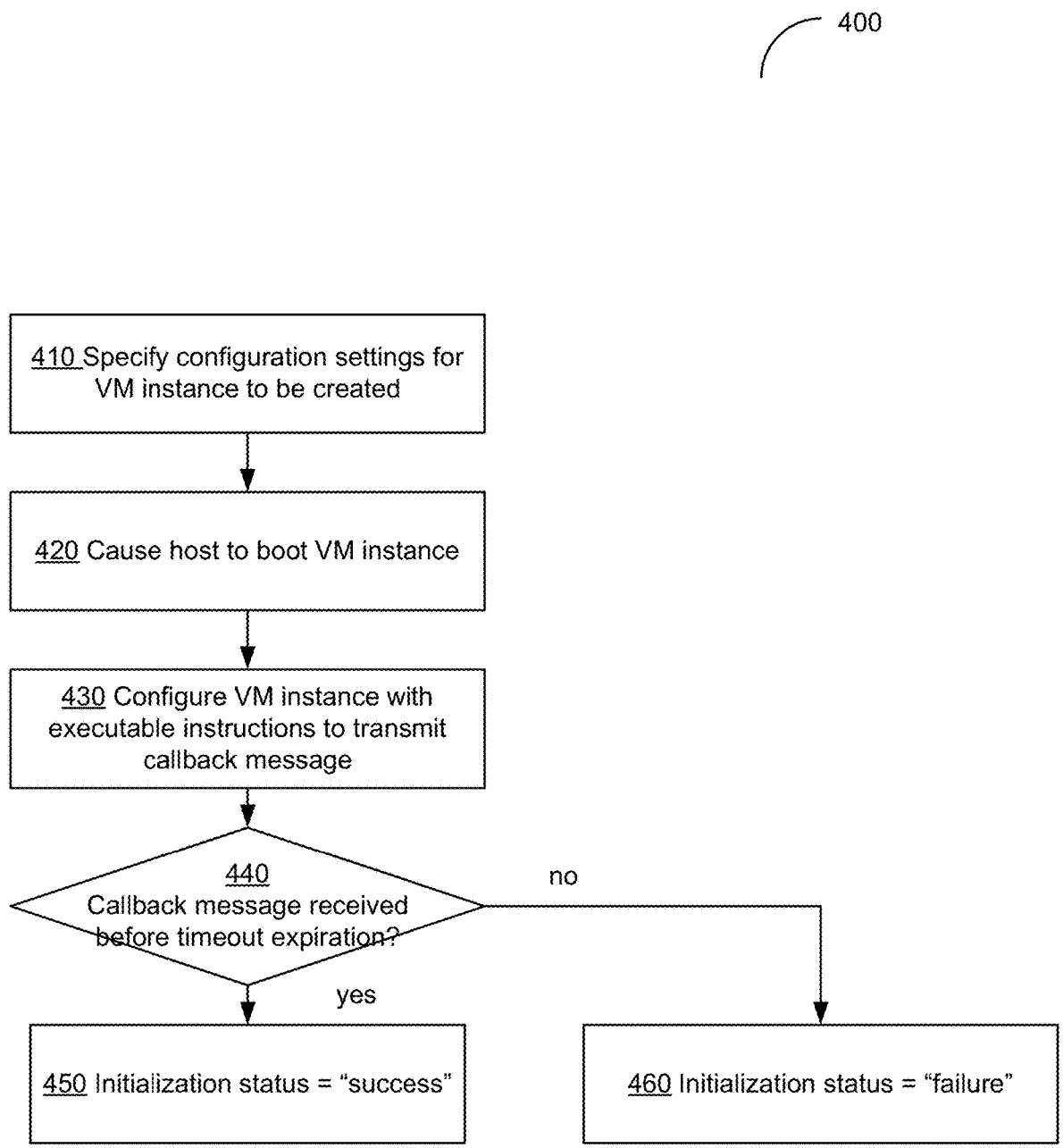
FIG. 4 depicts a flowchart of an example method performed by the virtualization manager for asserting the initialization status of a virtualized system, in accordance with one or more aspects of the present disclosure.

FIG. 4 depicts a flowchart of an example method 400 performed by the virtualization manager for asserting the initialization status of a virtualized system, in accordance with one or more aspects of the present disclosure. In certain implementations, method 400 may be performed by a single processing thread executed by a processing device. Alternatively, method 400 may be performed by two or more processing threads executed by one or more processing devices, such that each thread would execute one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the virtualization manager may specify configuration settings of a virtual machine instance to be created. The configuration settings comprise a callback address and an identifier of the virtual machine instance. The callback address may be specified by a combination of network address, a protocol identifier, a port identifier, and/or a file identifier. The identifier of the virtual machine instance may be represented by a cryptographic secret that is shared between the virtualization manager and the virtual machine, as described in more detail herein above.

At block 420, the virtualization manager may cause a host computer system to boot a virtual machine instance. In an illustrative example, the virtualization manager may transmit a command to the host computer system to retrieve a virtual machine image from a specified storage location and to boot a virtual machine instance using the retrieved image, as described in more detail herein above.

At block 430, the virtualization manager may configure the virtual machine instance with executable instructions causing the virtual machine instance to transmit, at a specified point in the virtual machine boot sequence, a notification to the callback address. The notification may include the identifier of the virtual machine. In various illustrative examples, the notification may further include at least part of a specified system log file, values of certain configuration parameters of the virtual machine instance, and/or values of certain environment variables of the virtual machine instance. The executable instructions may be in the form of an executable script, which may be pre-configured in the virtual machine image or may be dynamically fed to the virtual machine instance by the virtual machine instance initialization service. The callback address and the virtual machine instance identifier may be communicated to the virtual machine instance in response to the request issued by the virtual machine instance initialization service, as described in more detail herein above.

Responsive to receiving, at block 440, the notification from the virtual machine instance, the virtualization manager may, at block 450 assign the "success" value to the initialization status of the virtual machine instance. Otherwise, if the notification from the virtual machine instance is not received within a predetermined period of time elapsed since initiating the boot operation of the virtual machine instance, the virtualization manager may, at block 460 assign the "failure" value to the initialization status of the virtual machine instance.

Figure 5:
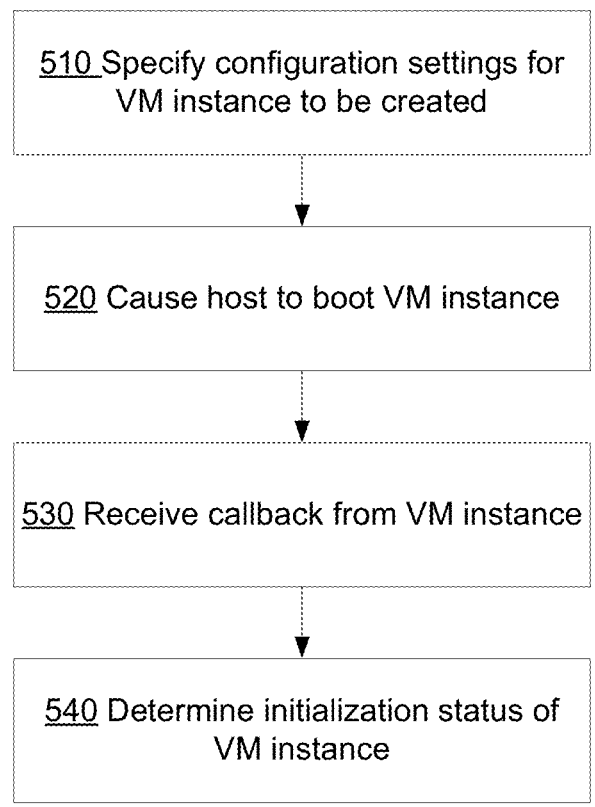
FIG. 5 depicts a flowchart of another example method performed by the virtualization manager for asserting the initialization status of a virtualized system, in accordance with one or more aspects of the present disclosure.

FIG. 5 depicts a flowchart of another example method 500 performed by the virtualization manager for asserting the initialization status of a virtualized system, in accordance with one or more aspects of the present disclosure. In certain implementations, method 500 may be performed by a single processing thread executed by a processing device. Alternatively, method 500 may be performed by two or more processing threads executed by one or more processing devices, such that each thread would execute one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, the virtualization manager may specify configuration settings of a virtual machine instance to be created. The configuration settings comprise a callback address and an identifier of the virtual machine instance, as described in more detail herein above.

At block 520, the virtualization manager may cause a host computer system to boot a virtual machine instance. In an illustrative example, the virtualization manager may transmit a command to the host computer system to retrieve a virtual machine image from a specified storage location and to boot a virtual machine instance using the retrieved image. The virtualization manager may further configure the virtual machine instance with executable instructions causing the virtual machine instance to transmit, at a specified point in the virtual machine boot sequence, a notification to the callback address, as described in more detail herein above.

Responsive to receiving, at block 530, the notification from the virtual machine instance, the virtualization manager may, at block 540 determine, in view of the notification, the initialization status of the virtual machine instance, as described in more detail herein above.

Figure 6:
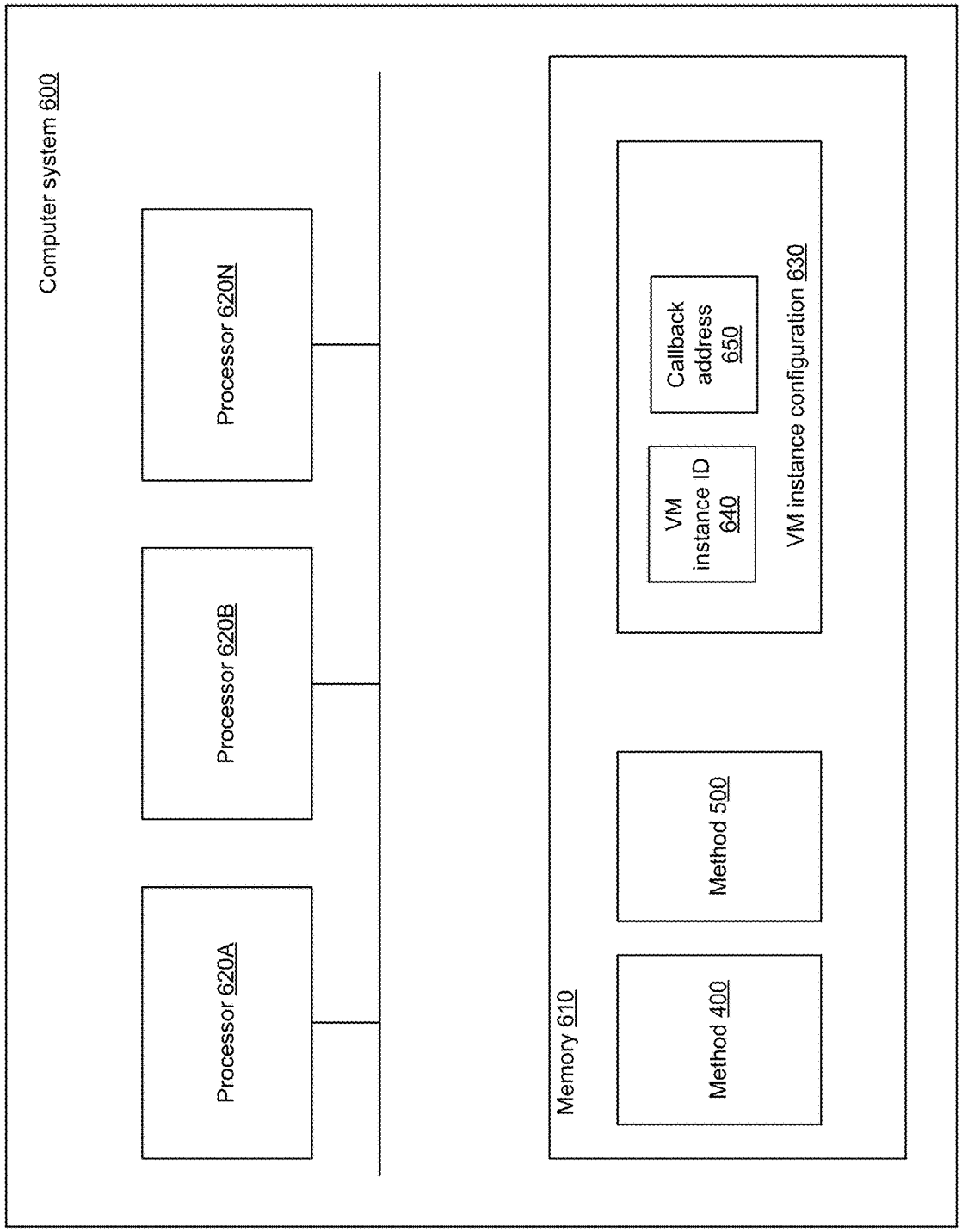
FIG. 6 depicts a high-level component diagram of an example computer system which may be employed to implement the systems and methods described herein.

FIG. 6 depicts a block diagram of an illustrative computer system 600 operating in accordance with one or more aspects of the disclosure. In various implementations, computer system 1000 may perform the functions of to the virtualization manager 110 of FIG. 1 and/or the orchestration server 110 of FIG. 2. Computer system 600 comprises a memory 610 and one or more physical processors 620A-620N, that are operatively coupled to the memory 610 and execute the code implementing the methods 400 and/or 500 of asserting the initialization status of a virtualized system. The memory may store the configuration settings 630 of a virtual machine instance to be built, including the virtual machine instance identifier 640 and the callback address 650, as described in more details herein above.

Figure 7:
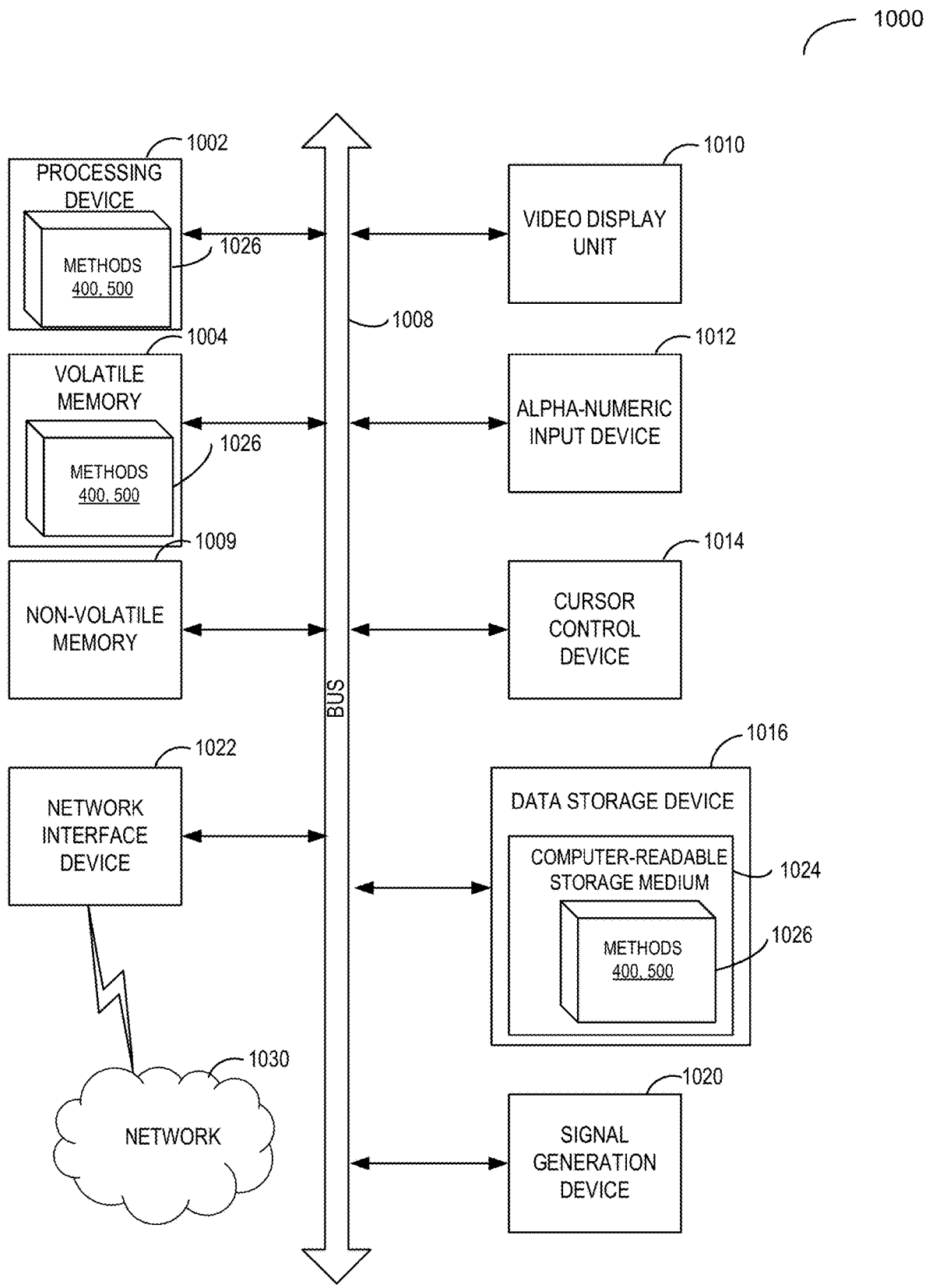
FIG. 7 depicts a high-level component diagram of another example computer system which may be employed to implement the systems and methods described herein.

FIG. 7 depicts a high-level component diagram of an example computer system which may be employed to implement the systems and methods described herein. In various implementations, computer system 1000 may perform the functions of to the virtualization manager 110 of FIG. 1 and/or the orchestration server 110 of FIG. 2. In certain implementations, computer system 1000 may be connected (e.g., via a network 1030, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1009 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 400 and/or 500 of asserting the initialization status of a virtualized system.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   specifying, by a virtualization manager, configuration settings of a virtual machine instance, wherein the configuration settings comprise a callback address and an identifier of the virtual machine instance;
   causing a host computer system to boot the virtual machine instance using the configuration settings;
   receiving, by the virtual machine instance, an executable script;
   executing, by the virtual machine instance, the executable script that transmits, to the callback address, a notification comprising the identifier of the virtual machine instance;
   receiving, at the callback address, the notification comprising the identifier of the virtual machine instance; and
   determining, in view of the notification, an initialization status of the virtual machine instance.

2. The method of claim 1, wherein receiving the notification further comprises:
   waiting for the notification for a predetermined period of time.

3. The method of claim 1, wherein the callback address comprises at least one of: a network address, a protocol identifier, a port identifier, or a file identifier.

4. The method of claim 1, wherein the identifier of the virtual machine instance is provided by a cryptographic secret that is shared between the virtualization manager and the virtual machine.

5. The method of claim 1, further comprising:
   configuring the virtual machine instance with executable instructions causing the virtual machine instance to transmit, to the callback address, the notification comprising the identifier of the virtual machine.

6. The method of claim 5, wherein the notification further comprises at least part of a system log file.

7. The method of claim 5, wherein the notification further comprises a value of a configuration parameter of the virtual machine instance.

8. The method of claim 5, wherein the notification further comprises a value of an environment variable of the virtual machine instance.

9. A system, comprising:
   a memory; and
   a processing device, coupled to the memory, the processing device to implement a virtualization manager, the virtualization manager to:
   initialize a callback server to accept callback messages from the virtual machine instances at a callback address;
   specify configuration settings of a virtual machine instance, wherein the configuration settings comprise the callback address and an identifier of the virtual machine instance;
   cause a host computer system to boot the virtual machine instance using the configuration settings;
   receive, at the callback address, a notification comprising the identifier of the virtual machine instance; and
   determine, in view of the notification, an initialization status of the virtual machine instance.

10. The system of claim 9, wherein receiving the notification further comprises:
waiting for the notification for a predetermined period of time.

11. The system of claim 9, wherein the callback address comprises at least one of: a network address, a protocol identifier, a port identifier, or a file identifier.

12. The system of claim 9, wherein the identifier of the virtual machine instance is provided by a cryptographic secret that is shared between the system and the virtual machine.

13. The system of claim 9, wherein the processing device is further to:
configure the virtual machine instance with executable instructions causing the virtual machine instance to transmit, to the callback address, the notification comprising the identifier of the virtual machine.

14. The system of claim 13, wherein the notification further comprises at least one of: a part of a system log file, a value of a configuration parameter of the virtual machine instance, or a value of an environment variable of the virtual machine instance.

15. A non-transitory computer-readable storage medium comprising executable instructions that, when executed by a processing device, cause the processing device to implement a virtualization manager, the virtualization manager to:
cause a host computer system to boot a virtual machine instance;
receive, from the virtual machine instance, a runtime request for configuration settings;
provide the configuration settings to the virtual machine instance, wherein the configuration settings comprise a callback address and an identifier of the virtual machine instance;
receive, at the callback address, a notification comprising the identifier of the virtual machine instance; and
determine, in view of the notification, an initialization status of the virtual machine instance.

16. The non-transitory computer-readable storage medium of claim 15, wherein receiving the notification further comprises:
waiting for the notification for a predetermined period of time.

17. The non-transitory computer-readable storage medium of claim 15, wherein the callback address comprises at least one of: a network address, a protocol identifier, a port identifier, or a file identifier.

18. The non-transitory computer-readable storage medium of claim 15, wherein the identifier of the virtual machine instance is provided by a cryptographic secret that is shared between the virtualization manager and the virtual machine.

19. The non-transitory computer-readable storage medium of claim 15, further comprising executable instructions causing the processing device to:
configure the virtual machine instance with executable instructions causing the virtual machine instance to transmit, to the callback address, the notification comprising the identifier of the virtual machine.

20. The non-transitory computer-readable storage medium of claim 15, wherein the notification further comprises at least one of: a part of a system log file, a value of a configuration parameter of the virtual machine instance, or a value of an environment variable of the virtual machine instance.

* * * * *